June 19, 1928.

J. H. NESBITT 1,673,987

MOLD CUTTING MACHINE

Filed July 16, 1926 4 Sheets-Sheet 1

Inventor

James H. Nesbitt

By F. E. Sharman

Attorney

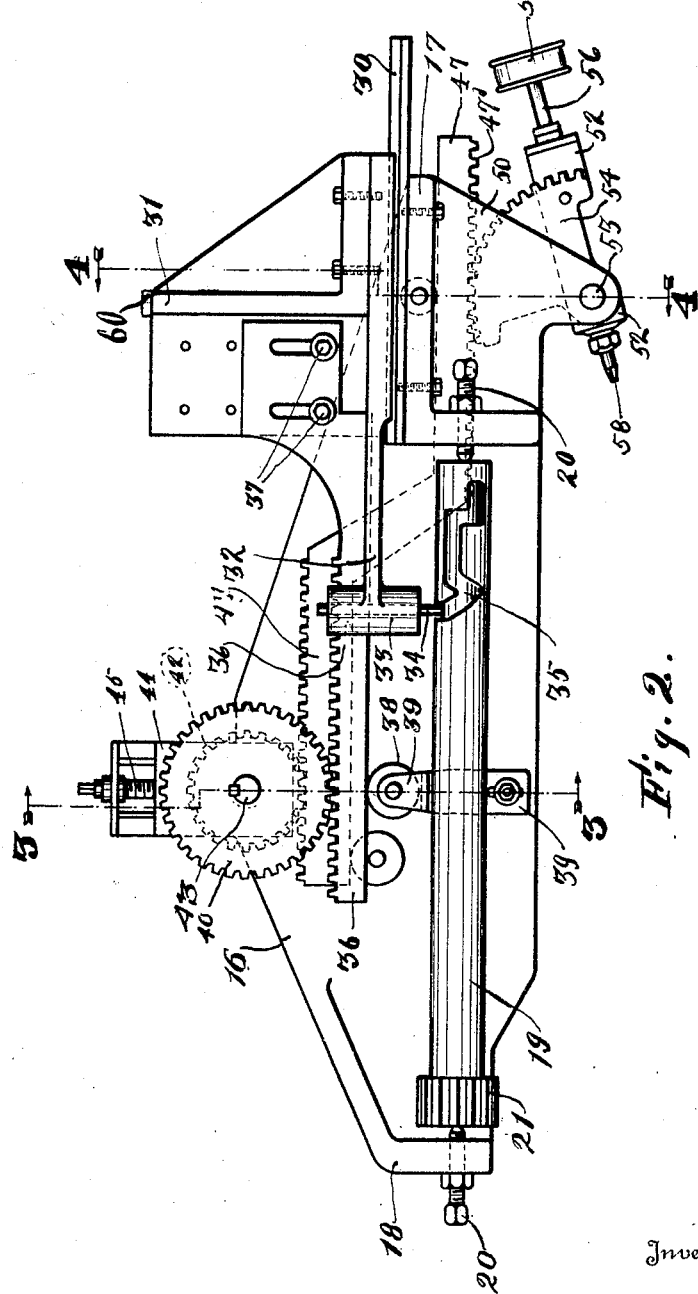

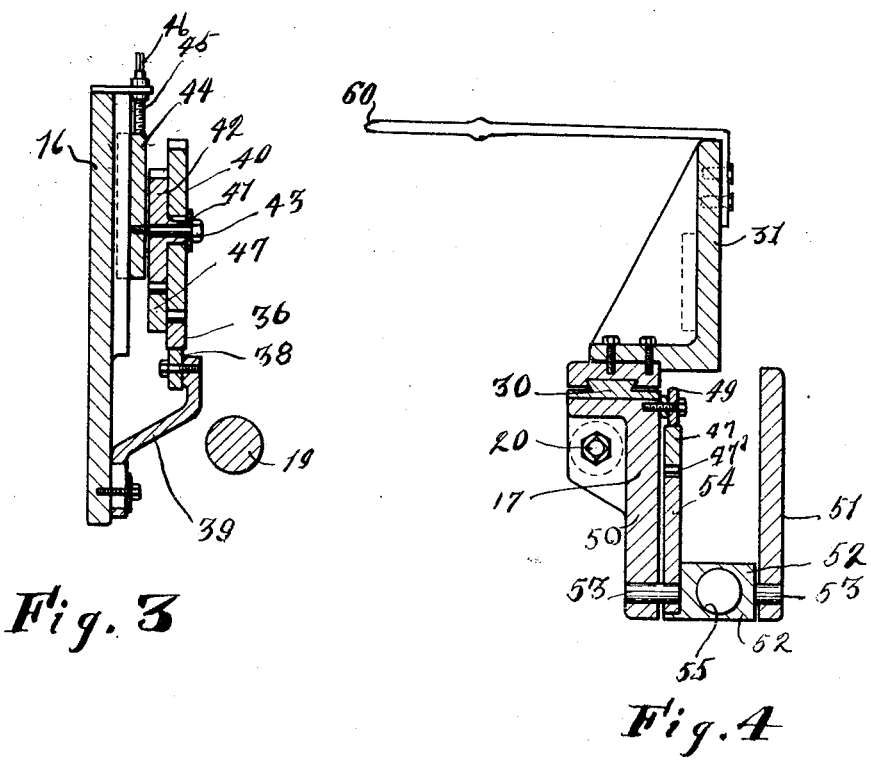

June 19, 1928.

J. H. NESBITT 1,673,987

MOLD CUTTING MACHINE

Filed July 16, 1926

Inventor

James H. Nesbitt

By F. E. Shannon

Attorney

Patented June 19, 1928.

1,673,987

UNITED STATES PATENT OFFICE.

JAMES H. NESBITT, OF AKRON, OHIO, ASSIGNOR TO THE AKRON RUBBER MOLD AND MACHINE COMPANY, OF AKRON, OHIO, A CORPORATION OF OHIO.

MOLD-CUTTING MACHINE.

Application filed July 16, 1926. Serial No. 122,865.

This invention relates to new and novel improvements in machines for manufacturing articles having transversely arcuate cavities and particularly to machines for cutting, machining or otherwise working on the walls of an annular or arcuate cavity of curved or arcuate cross section.

While the invention is adapted for use generally wherever it may be applied, it is particularly intended for use in cutting depressions of a desired configuration in the walls of the cavities of rubber tire molds.

The invention will be herein illustrated and described as applied to a machine for cutting a tread design in molds for manufacturing rubber tires.

In the manufacture of rubber tires, it is desirable to provide a road engaging surface of a particular design. This road engaging surface, commonly known as a non-skid tread, extends circumferentially of the tire and is usually in the form of a small pattern continuously joined or successively repeated to form a peripheral and lateral surface of uniform design extending entirely around the tire.

In machines for cutting this design in the rubber tire molds, a profile pattern or jig is ordinarily employed to limit the arcuate movement of the tool and the rotary movement of the work to direct and control the operation of the tool within the limits of the selected design.

The main object of this invention is to provide a machine in which a depressed profile jig may be used which is considerably larger than the design to be cut in the mold whereby slight variations or inaccuracies in the pattern will not be noticeable in the finished product.

A further object is to provide a machine of the character above set forth in which the depressed profile in the jig may be in any proportional size to the finished design and which will exactly conform to the shape and contour of the design to be formed in the product and to thereby provide means whereby the pattern or jig can be more quickly, conveniently and accurately formed.

A still further object is to provide a machine in which different combinations of gears may be selectively employed to obtain from a single jig a cut of the same shape and contour in any proportional size and to thereby provide means whereby a single jig may be employed to produce the same pattern in different sizes.

An additional object is to provide a machine of the class above indicated which will be of simple, durable construction and which will be rapid and accurate in operation and which may be easily and conveniently operated.

The above objects are accomplished and additional ends are attained by the novel construction, combination and arrangement of parts hereinafter described and illustrated in the accompanying drawing wherein is shown one form of the invention, it being understood that the invention is capable of various adaptations and that changes and modifications may be made or resort had to substitutions which come within the spirit of the invention as set forth in the appended claims.

In the accompanying drawings like characters of reference are employed to designate like parts as the same may appear in any of the several views and in which:—

Figure 2 is a side elevational view of the upper portion of the machine.

Figure 3 is a cross sectional view taken as indicated by the lines 3—3 of Figure 2.

Figure 4 is a cross sectional view taken as indicated by the lines 4—4 of Figure 4.

Figure 1:
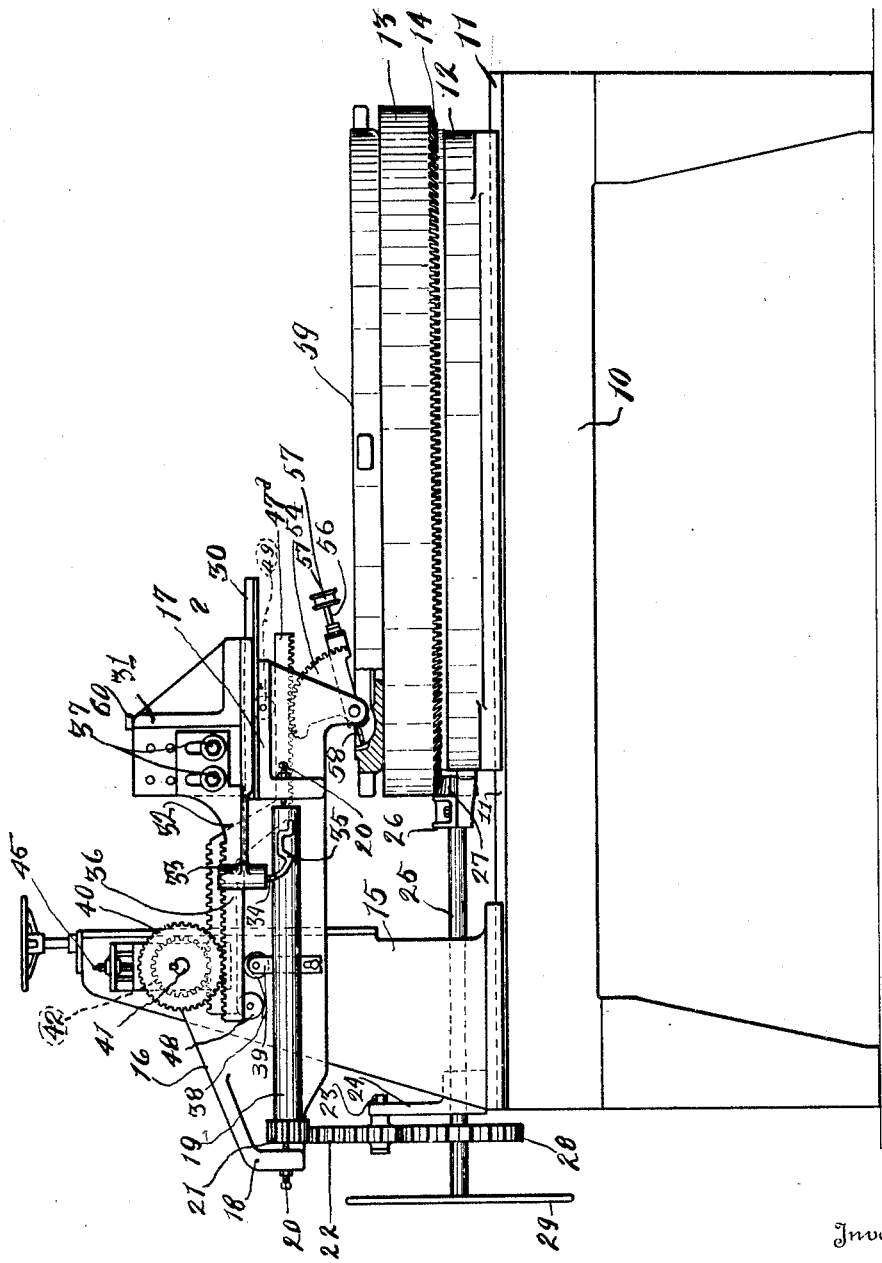
Figure 1 is a side elevational view of a machine constructed in accordance with this invention showing the same with a tire mold operatively mounted thereon, the same being partly broken away and shown in cross section to more clearly illustrate the invention.

The invention will now be described with reference to the particular adaptation thereof disclosed in the drawings in which the numeral 10 is used to denote a suitable supporting structure. The supporting structure 10 is provided on the upper face thereof with longitudinally directed side ribs 11 on which is slidably mounted a work supporting member 12. The numeral 13 denotes a work holder which is rotatably mounted on the work support 12. The work holder 13 is provided with a downwardly presented annular gear face 14.

The numeral 15 denotes a standard which is suitably secured to one end of the supporting structure 10. The standard is provided with a suitable head 16 which is secured to one side thereof so as to project over one side of the work support 13. The head 16 is provided at the forward end thereof with a vertically disposed bracket 17 and at the rearward end thereof with a parallel bracket 18. The numeral 19 denotes a cylindrical pattern member which extends longitudinally between the brackets 17 and 18 and is pivotally mounted therebetween by means of the screw bolts 20. The cylindrical pattern member 19 is provided at the rear end thereof with a pinion 21, arranged to mesh with an intermediate gear 22. The intermediate gear 22 is mounted on a stub shaft 23 which is suitably secured by a bracket 24 to the standard 15. The numeral 25 denotes a shaft having its forward end rotatably mounted in the bracket 26, on the work support 12 and the rear end thereof mounted in the bracket 24. The shaft 25 is provided on the forward end thereof with a beveled pinion 27. The pinion 27 is in mesh with the gear face 14 whereby a rotation of the shaft 25 will cause a rotation of the work holder 12. The shaft 25 is provided at a point adjacent the rear end thereof with a gear wheel 28 which is in mesh with the intermediate wheel 22.

The numeral 29 denotes a hand wheel which is fixedly secured to the rearwardly projecting end of the shaft 25. The bracket 17 is provided on the upper face thereof with a horizontal guideway 30 on which is slidably mounted a member 31. The member 31 is provided with a portion 32 which projects rearwardly at a point above the cylindrical pattern member 19. The portion 32 is provided at the rear end thereof with an upstanding cylindrical portion 33 in which is mounted a vertical pin 34.

The numeral 35 denotes a profile pattern which is cut in the form of a groove or depression on the cylindrical member 19. The pin 34 is adapted to be entered in the depressed pattern or profile 35. The numeral 36 denotes a rack which is adjustably secured to the member 31 by means of the bolts 37 or other suitable fastening means. The rack 36 extends rearwardly and is supported at its rear end thereof with a roller 38 which is mounted on a suitable bracket 39.

The numeral 40 denotes a gear wheel which is detachably fixed on a hub 41 of a second gear 42. The said gears are rotatably mounted on a bolt 43 which is secured in the block 44. The block 44 is adjustably secured to the head 16 by means of the screw 45; the screw 45 being provided at the upper end thereof with a squared portion 46 which may be engaged to raise or lower the block 44 relative to said head. The gear wheel 40 is in mesh with the rack 36 whereby a longitudinal movement of said rack will cause a rotary movement of said wheel.

The numeral 47 denotes a second rack which is suitably mounted for longitudinal movement on the rollers 48 and 49. The rack member 47 is provided on the rearward portion thereof with upwardly presented teeth which are in mesh with the gear wheel 42. The central portion of the rack member 46 is inclined downwardly, and the forward portion thereof is provided with a downwardly presented rack face 47$^a$.

The head 16 is provided on the forward end thereof with a downwardly projecting, parallelly spaced brackets 50 and 51. The spindle head 52 is rotatably mounted between said brackets by means of the shafts 53, for movement on a horizontal axis. The numeral 54 denotes a sector gear which is mounted on the shaft 53 and is rigidly secured to the spindle head 52. The sector gear is in mesh with the rack face 47$^a$ whereby a longitudinal movement of the rack 47 will cause a rotary movement of the spindle 52 on the shaft 53. The spindle head is provided with a bore 55 which extends therethrough at a right angle to the shaft 53. A suitable spindle 56 is mounted in said bore. The numeral 57 denotes a drive pulley which is secured to the outwardly projecting end of said spindle and the numeral 58 denotes a tool which is secured to the downwardly projecting end thereof. The numeral 59 denotes a section of a tire mold as it is positioned in the work holder 13. A suitable handle 60 is secured to the member 31 whereby the member may be moved on the guide 30 to swing the tool spindle in an arcuate path. It will be noted that the handle wheel 29 may be operated to revolve the mold 59 within certain limits; the revoluble movement being limited by the pin 34, entered in the depression pattern 35 in the rotatable pattern member 19. It will also be noted that the tool 58 may be moved in an arcuate path to cut the walls of the mold 59 and that its arcuate movement is likewise limited by means of the said pin 34.

Figures 5, 6, 7:
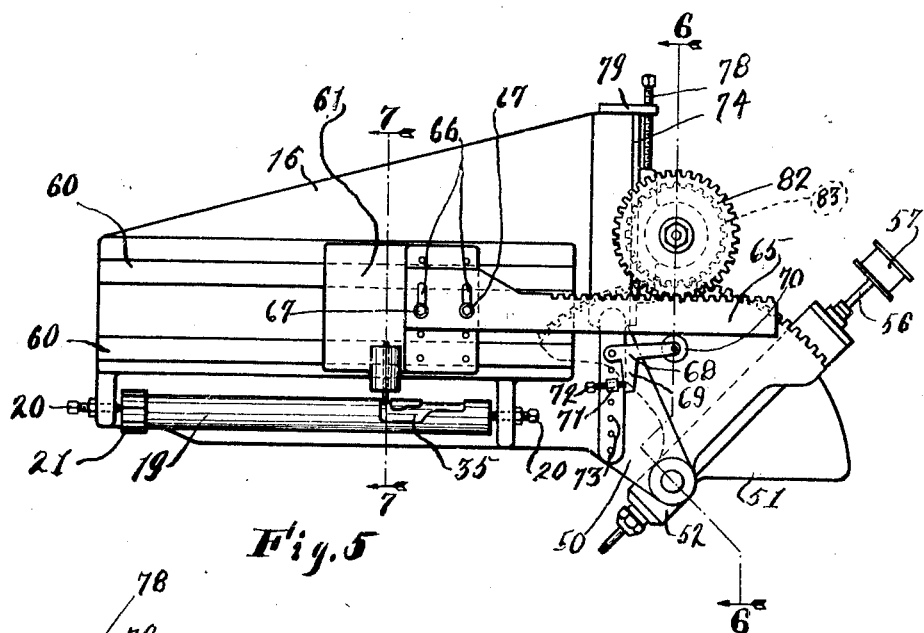
Figure 5 is a side elevational view showing a modified form of the invention.
Figure 6 is a cross sectional view of same taken as indicated by the line 6—6 of Figure 5.
Figure 7 is a cross sectional view taken as indicated by the line 7—7 of Figure 4.

In the modification of the invention shown in Figures 5, 6 and 7, the head 16 is provided with longitudinally disposed side ribs 60 in which is slidably mounted a stylus carrying member 61. The ribs 60 are disposed longitudinally of the cylindrical member 19 and the member 61 is mounted thereon so as to be moveable longitudinally thereof. The member 61 is provided with a stylus arm 62 having a vertical bore 63 in which is mounted a stylus 64. The arm 62 projects above the pattern member 19 whereby the stylus 64 can be entered in the pattern 35 thereby providing means whereby the longitudinal movement of the member 61 will be limited by the longitudinal extent of the pattern 35.

The numeral 65 denotes a rack which is secured to the member 61 so as to project horizontally therefrom with the teeth of the rack presented on the upper side thereof. While the rack 65 may be secured to the member 61 in any suitable manner, I prefer to secure the same in the manner shown in the drawing wherein the rack is provided adjacent the rear end thereof with two vertical slots 66 which are spaced in parallel relation to each other. The numeral 67 is used to denote bolts which are entered through said slots operatively positioned in suitable bores in the member 61 whereby the bolts 67 may be operated to hold the rack 65 in position in the member 61. An arm 68 is pivotally secured to the head 16 at a point below the rack 65, with the free end thereof positioned beneath the rack 65 and arranged to swing in a vertical plane to said rack. The arm 68 is provided at the free end thereof with a suitable roller 70 which is arranged to contact with the lower face of the rack 65 whereby the free end of said rack is supported by said roller. The arm 68 is provided with a downwardly projecting portion 69. The numeral 71 denotes a stud which is secured to said frame 16 at a point below the arm 68. The stud is provided with a threaded bore in which is mounted a screw bolt 72 which may be operated to bear against the downward projecting portion 69 to raise or lower the roller 70. The head 16 is provided with a vertically alined row of bores 73 which may be selectively employed to mount the arm 68 and the stud 73. It will thus be seen that the horizontal rack 65 may be adjusted vertically of the member 61.

The head 16 is provided at the forward end thereof with a vertical slide 74 on which is mounted a block 75. The block 75 is provided with a bearing 76 in which is rotatably mounted a shaft 77. The numeral 78 denotes a screw bolt which is threaded in a vertical bore in the block 79 which is positioned directly above the slide way 74. The lower end of the bolt 78 is rotatably secured to the carriage 75 whereby the bolt 78 may be operated to raise or lower said block 75.

The numeral 80 denotes bolts which are positioned through suitable bores in the block 75 and are entered through a vertical slot 81 in the slide-way 74 whereby the bolts 80 may be operated to set the block 75 in a fixed position. The horizontal shaft 77 is thus disposed in parallel relation to the shaft 53. The shaft 77 is provided on one end thereof with a gear wheel 82 which is detachably secured thereto and which is meshed with the teeth on the rack 65. The other end of the shaft 77 is provided with a gear wheel 83 which is in mesh with the sector gear 54. It will thus be seen that a movement of the spindle 52 on the pin 53 will be limited by the stylus 64 to the longitudinal extent of the pattern 35. A plurality of sets of gears 82 and 83 are provided whereby the gears of different ratios may be employed so that the movement of the tool 58 may be changed relative to the pattern 35. As the rack 65 is adjustable on the member 61 and the block 75 is adjustable on the head 16, any desired size of gear may be used on either end of the shaft 77 whereby the same pattern 35 may be employed to cut the design of the pattern in the molds of different sizes.

It will thus be seen that the tool 58 can only be operated within an area limited by the depressed pattern 35. In changing from one mold to another, or in changing patterns, the gears 41 and 42 may be changed for gears of other sizes and proportions. In this way any gear ratio may be obtained by adjusting the rack 36 on the bolts 37 and by operating the screws 45 to bring the gear 42 into operative engagement with the rack 47.

It will be noted that the depressed pattern may be exactly the same size as the cut to be made in the mold or it can be made larger or smaller and that the several dimensions of the pattern will be proportionately the same regardless of its relative size. It will also be noted that the same pattern can be used to make cuts of different sizes—the only change that is necessary being to change the gears 36 and 40 and substitute gears of a different ratio.

While I have shown and described my invention as embodied in a machine for cutting tire molds, it is to be understood that it may be adapted for other purposes and may be used wherever it may be applied.

Having thus illustrated my invention and described the same in detail, what I claim as new and desire to secure by Letters Patent is:—

1. In a device of the class described, a frame, a work support rotatably mounted thereon, a tool holding means rotatably mounted on said frame for movement in a plane extending transversely to the plane of the work support, a tool rotatably mounted on said tool holding means, the axis of said tool intersecting the axis of the holding means, a gear fixed to said tool holding means, a rack meshed with said gear; a cylindrical member rotatably mounted on said frame, a depressed pattern on said member, gears operatively connecting said member with said work support, a stylus holding member slidably mounted on said frame, a stylus mounted thereon and adapted to be entered in the depressed pattern, a rack on said stylus holding member and means to operatively connect said racks, said means comprising coaxially connected gears, means to simultaneously rotate said cylindrical member and said work support and means to move said stylus holding member.

2. In a device of the class described, a frame, a work support rotatably mounted thereon, tool holding means rotatably mounted on said frame for movement in a plane extending transversely to the plane of the work support, a tool rotatably mounted in said tool holding means, the axis of said tool intersecting the axis of the tool holding means; a gear fixed to said tool support, a rack meshed with said gear, a cylindrical member rotatably mounted on said frame, said member having a depressed pattern, common driving means operatively connecting said member with said work support, a stylus mounted thereon and adapted to be entered in the depressed pattern, a rack on said stylus holder, a plurality of pairs of interlocking gears of different ratios arranged to be selectively employed to operatively connect said racks, and means to move said stylus holding member.

3. In a device of the class described, a rotatable work support, tool supporting means rotatably mounted for movement in a plane extending transversely to the plane of the work support, a tool spindle rotatably mounted in said tool support, the axis of said spindle intersecting the axis of the tool support; a gear fixed to said tool support, a rack meshed with said gear, a rotatable pattern member having a depressed pattern thereon, gears operatively connecting said member with said work support, a stylus holding member mounted for movement longitudinally of said rotatable pattern member, a stylus mounted therein and adapted to be entered in said pattern, a rack on said stylus holding member and means to operatively connect said racks, said means comprising a plurality of pairs of coaxially connected gears of different ratios, common driving means for said cylindrical member and said work support and means to move said stylus holding member.

4. In a device of the class described, a frame, a work support rotatably mounted thereon, tool supporting means rotatably mounted on said frame for movement on an axis disposed at a right angle to the axis of the work support, a tool spindle rotatably mounted in said tool supporting means, a sector gear on said tool supporting means, a rack meshed with said gear, a cylindrical member rotatably mounted on said frame, a depressed pattern carried by said member, a stylus holder slidably mounted on said frame, a rack on said stylus member, a gear meshed with the last named rack, a second gear coaxially secured thereto, said second gear meshed with the first named rack and gears operatively connecting said cylindrical member with said work support.

5. In a device of the class described, a frame, a work support rotatably mounted thereon, tool supporting means rotatably mounted on said frame for movement on an axis disposed at a right angle to the axis of the work support, a tool rotatably mounted in said tool supporting means, a sector gear on said tool supporting means, a rack meshed with said gear, a cylindrical member rotatably mounted on said frame, a depressed pattern carried by said member, a stylus holder slidably mounted on said frame for movement longitudinally of said cylindrical member, a rack on said stylus holder, a gear meshed with the last named rack, a second gear coaxially secured thereto, said second gear meshed with the first named rack, gears operatively connecting said cylindrical member with said work support, and means to drive said gears.

6. In a device of the class described, a rotatable work support, a rotatably mounted tool spindle, a spindle holder pivotally mounted for movement in a plane disposed transversely to the plane of the work support, a sector gear on said spindle holder, a rack meshed with said gear, a cylindrical member rotatably mounted for movement on an axis disposed at a right angle to the axis of said gear, said member adapted to carry a depressed pattern, a stylus holder slidably mounted for movement longitudinally of said cylindrical member, a rack on said stylus holder, a gear support adjustably mounted for movement to and from said racks, a pair of coaxially arranged gears detachably mounted on said gear support, means connecting said gears, one of said gears meshed with the first named rack, the other gear meshed with the other rack and common driving means connecting said cylindrical member with said work support.

7. In a device of the class described, a rotatable work support, a spindle holder mounted for movement in a plane disposed transversely to the plane of the work support, a tool spindle rotatably mounted on said spindle holder, a sector gear mounted on said spindle holder, a rotatably mounted cylindrical member, a depressed pattern carried thereby, a stylus holder mounted for movement longitudinally of said cylindrical member, a stylus carried by said stylus holder, said stylus adapted to be entered in said pattern to limit the rotary movement of said pattern, means operatively connecting said pattern with said work support whereby the rotary movement of the work support is limited by the movement of said pattern and means operatively connecting said sector gear to said stylus holder whereby the pivotal movement of said spindle is limited by the longitudinal extent of said pattern; said means including a rack and a plurality of gears adapted to be selectively employed in pairs to regulate the extent of movement of the tool spindle relative to the longitudinal extent of said pattern.

8. In a device of the class described, a rotatably mounted tool spindle, a spindle holder pivotally mounted for movement on an axis extending transversely to the axis of the tool spindle, a gear secured on said tool spindle a rotatably mounted cylindrical pattern member, a depressed pattern carried by said member, a stylus holder slidably mounted for movement longitudinally of said cylindrical member, a stylus carried by said holder, said stylus arranged to be seated in the depression in said pattern and means operatively connecting said gear to said stylus holder whereby the pivotal movement of the spindle holder is limited to the longitudinal extent of said pattern; said means including a rack and a plurality of gears adapted to be selectively employed in pairs to regulate the extent of movement of the tool spindle relative to the longitudinal extent of said pattern.

In testimony whereof I have hereunto set my hand.

JAMES H. NESBITT.